(12) United States Patent
Mao et al.

(10) Patent No.: US 11,532,324 B2
(45) Date of Patent: Dec. 20, 2022

(54) VERTICAL JUNCTION TO PROVIDE OPTIMAL TRANSVERSE BIAS FOR DUAL FREE LAYER READ HEADS

(71) Applicant: Western Digital Technologies, Inc., San Jose, CA (US)

(72) Inventors: Ming Mao, Dublin, CA (US); Chen-Jung Chien, Mountain View, CA (US); Daniele Mauri, San Jose, CA (US); Goncalo Marcos Baião De Albuquerque, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/184,541

(22) Filed: Feb. 24, 2021

(65) Prior Publication Data

US 2022/0115035 A1    Apr. 14, 2022

Related U.S. Application Data

(60) Provisional application No. 63/090,963, filed on Oct. 13, 2020.

(51) Int. Cl.
*G11B 5/39* (2006.01)

(52) U.S. Cl.
CPC ............ *G11B 5/3932* (2013.01); *G11B 5/398* (2013.01); *G11B 5/3909* (2013.01); *G11B 5/3912* (2013.01); *G11B 5/3951* (2013.01); *G11B 2005/3996* (2013.01)

(58) Field of Classification Search
None
See application file for complete search history.

(56) References Cited

U.S. PATENT DOCUMENTS

| 7,035,062 | B1 * | 4/2006 | Mao et al. | ............ | G11B 5/3912 |
| | | | | | 360/324.2 |
| 8,611,054 | B1 * | 12/2013 | Shang et al. | ......... | G11B 5/3932 |
| | | | | | 360/324.12 |
| 8,842,396 | B1 | 9/2014 | Zhu | | |
| 9,076,468 | B1 * | 7/2015 | Keener et al. | ....... | G11B 5/3932 |

(Continued)

OTHER PUBLICATIONS

Childress, J. R. et al., "Fabrication and Recording Study of All-Metal Dual-Spin-Valve CPP Read Heads," IEEE Transactions on Magnetics, vol. 42, No. 10, Oct. 2006, pp. 2444-2446.

*Primary Examiner* — Craig A. Renner
(74) *Attorney, Agent, or Firm* — Patterson & Sheridan, LLP; Steven H. VerSteeg

(57) ABSTRACT

The present disclosure generally relates to a read head assembly having a dual free layer (DFL) structure disposed between a first shield and a second shield at a media facing surface. The read head assembly further comprises a rear hard bias (RHB) structure disposed adjacent to the DFL structure recessed from the media facing surface, where an insulation layer separates the RHB structure from the DFL structure. The insulation layer is disposed perpendicularly between the first shield and the second shield. The DFL structure comprises a first free layer and a second free layer having equal stripe heights from the media facing surface to the insulation layer. The RHB structure comprises a seed layer, a bulk layer, and a capping layer. The capping layer and the insulation layer prevent the bulk layer from contacting the second shield.

20 Claims, 9 Drawing Sheets

(56) References Cited

U.S. PATENT DOCUMENTS

| | | |
|---|---|---|
| 9,153,258 B2 | 10/2015 | Le et al. |
| 9,165,574 B2 | 10/2015 | Covington et al. |
| 9,378,761 B1* | 6/2016 | Seagle ................. G11B 5/3932 |
| 9,449,621 B1 | 9/2016 | Mauri et al. |
| 11,087,785 B1* | 8/2021 | Mao et al. ........... G11B 5/3909 |
| 2009/0034132 A1* | 2/2009 | Miyauchi et al. ... G11B 5/3912 |
| | | 360/324 |
| 2009/0034133 A1* | 2/2009 | Miyauchi et al. ... G11B 5/3932 |
| | | 360/324 |
| 2009/0109580 A1* | 4/2009 | Ayukawa et al. .... G11B 5/3932 |
| | | 360/324.12 |
| 2009/0207534 A1* | 8/2009 | Miyauchi et al. ... G11B 5/3932 |
| | | 360/324.11 |
| 2009/0213502 A1* | 8/2009 | Miyauchi et al. ... G11B 5/3932 |
| | | 360/319 |
| 2010/0079917 A1* | 4/2010 | Miyauchi et al. ... G11B 5/3909 |
| | | 360/324.12 |
| 2011/0051291 A1* | 3/2011 | Miyauchi et al. ... G11B 5/3932 |
| | | 360/319 |
| 2011/0091744 A1* | 4/2011 | Kawamori et al. .. G11B 5/3912 |
| | | 428/810 |
| 2011/0228428 A1* | 9/2011 | Dimitrov et al. .... G11B 5/3932 |
| | | 360/320 |
| 2011/0232079 A1* | 9/2011 | Miyauchi et al. ... G11B 5/3912 |
| | | 29/603.07 |
| 2011/0279923 A1* | 11/2011 | Miyauchi et al. ... G11B 5/3912 |
| | | 360/319 |
| 2011/0317313 A1* | 12/2011 | Miyauchi et al. ... G11B 5/3912 |
| | | 360/319 |
| 2012/0268846 A1* | 10/2012 | Gadbois et al. ..... G11B 5/3912 |
| | | 360/319 |
| 2012/0268847 A1* | 10/2012 | Dimitrov et al. ...... G11B 5/398 |
| | | 360/320 |
| 2013/0027812 A1* | 1/2013 | Scholz et al. ........ G11B 5/3912 |
| | | 360/235.4 |
| 2013/0065084 A1* | 3/2013 | Dimitrov et al. .... G11B 5/3912 |
| | | 428/810 |
| 2013/0069642 A1* | 3/2013 | Sapozhnikov et al. ..................... G01R 33/1284 |
| | | 324/260 |
| 2014/0004385 A1* | 1/2014 | Colak et al. ......... G11B 5/3932 |
| | | 428/815 |
| 2014/0004386 A1* | 1/2014 | Covington et al. .. G11B 5/3932 |
| | | 428/800 |
| 2014/0022668 A1* | 1/2014 | Takagishi et al. ... G11B 5/3912 |
| | | 360/319 |
| 2014/0057133 A1* | 2/2014 | Boonstra ............. G11B 5/3932 |
| | | 428/810 |
| 2014/0268421 A1* | 9/2014 | Zhu ...................... G11B 5/3932 |
| | | 360/235.4 |
| 2014/0327988 A1 | 11/2014 | Cao et al. |
| 2015/0144592 A1* | 5/2015 | Iwasaki et al. ...... G11B 5/3912 |
| | | 216/22 |
| 2016/0055866 A1* | 2/2016 | Le et al. .............. G11B 5/3932 |
| | | 360/75 |

* cited by examiner

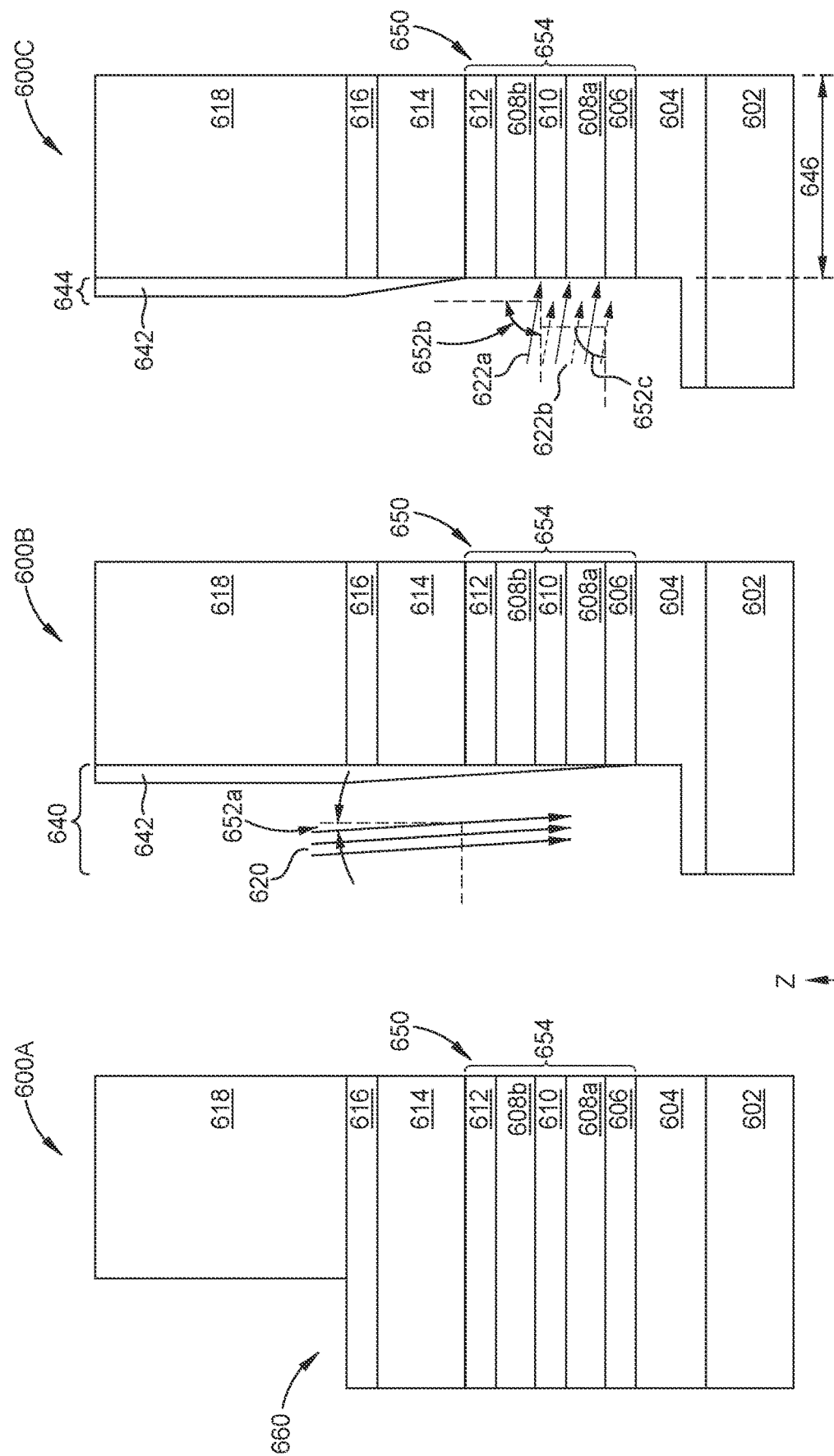

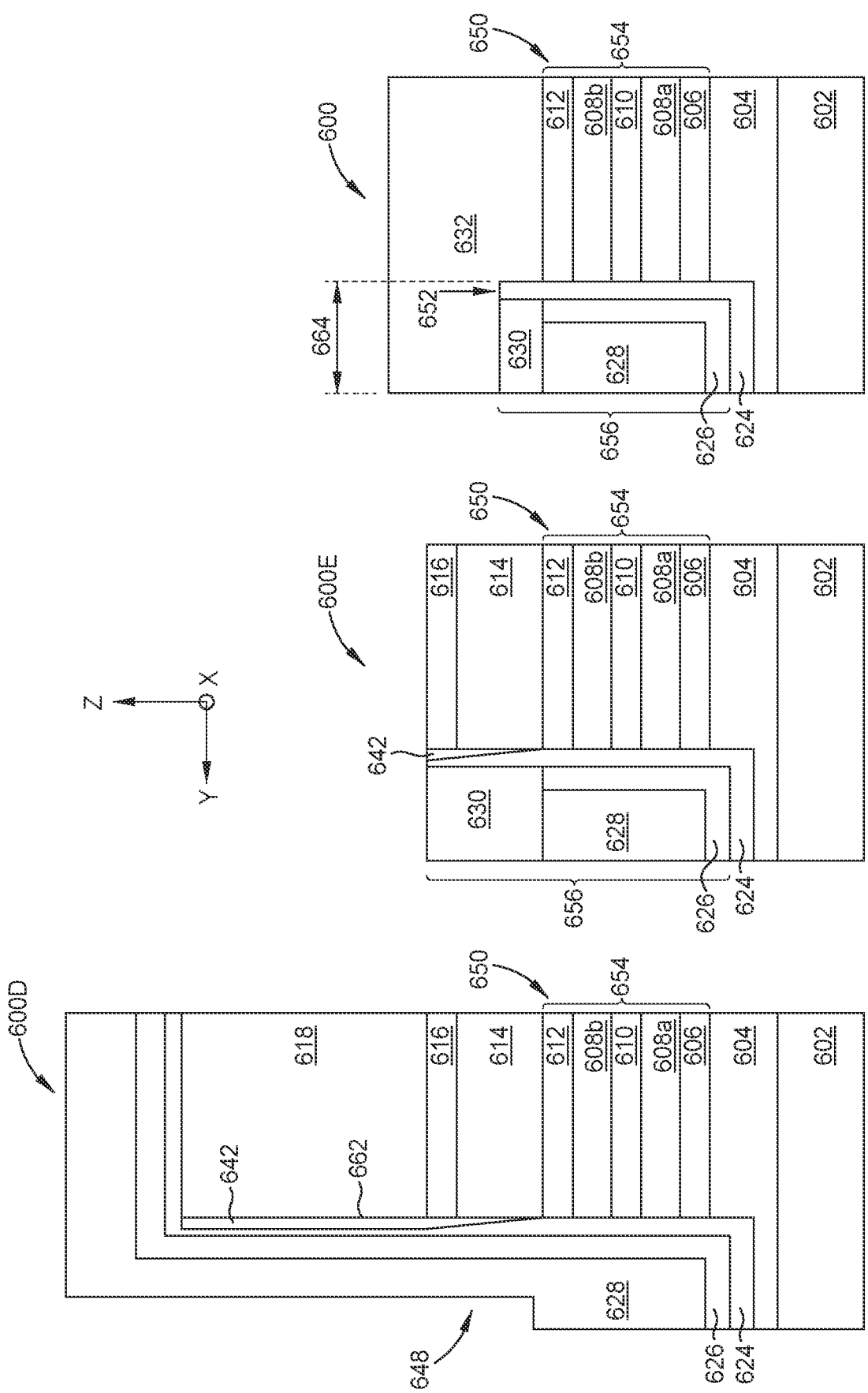

VERTICAL JUNCTION TO PROVIDE OPTIMAL TRANSVERSE BIAS FOR DUAL FREE LAYER READ HEADS

CROSS-REFERENCE TO RELATED APPLICATIONS

This application claims benefit of U.S. provisional patent application Ser. No. 63/090,963, filed Oct. 13, 2020, which is herein incorporated by reference.

BACKGROUND OF THE DISCLOSURE

Field of the Disclosure

Embodiments of the present disclosure generally relate to a dual free layer (DFL) tunnel magneto-resistive (TMR) read head having a rear hard bias (RHB) structure.

Description of the Related Art

Read heads typically include an antiferromagnetic (AFM) layer, which results in a fairly large spacing between shields. A read head without an AFM layer can shrink the distance between shields while also eliminating head instabilities that come from thermal fluctuations in AFM grains.

One such read head is a dual free layer (DFL) read head that has a DFL sensor. A DFL read head does not have an AFM layer, but instead has two free layers individually stabilized longitudinally by antiferromagnetically coupled (AFC) soft bias (SB) structures on either side of the sensor between the shields. The DFL sensor operates in a scissor mode when transversally biased at the stripe back edge by a permanent magnetic or rear head bias (RHB) structure that delivers twice as high of a readout amplitude with self-noise cancellation. One major challenge in a DFL read head is that the RHB provides a strong field. The RHB field needs to not only be strong, but also needs to be uniformly applied to enable the free layers to operate in the scissor mode. When operating in scissor mode, the DFL read head can deliver much larger readout amplitudes and reduced magnetic noise.

Therefore, there is a need in the art for an improved DFL read head that can provide a stable transverse bias to each free layer of the DFL read head.

SUMMARY OF THE DISCLOSURE

The present disclosure generally relates to a read head assembly having a dual free layer (DFL) structure disposed between a first shield and a second shield at a media facing surface. The read head assembly further comprises a rear hard bias (RHB) structure disposed adjacent to the DFL structure recessed from the media facing surface, where an insulation layer separates the RHB structure from the DFL structure. The insulation layer is disposed perpendicularly between the first shield and the second shield. The DFL structure comprises a first free layer and a second free layer having equal stripe heights from the media facing surface to the insulation layer. The RHB structure comprises a seed layer, a bulk layer, and a capping layer. The capping layer and the insulation layer prevent the bulk layer from contacting the second shield.

In one embodiment, a magnetic read head assembly comprises a first shield, a second shield disposed over the first shield, and a RHB structure disposed between the first shield and the second shield, the RHB structure formed by milling into the first shield a first depth. The RHB structure comprises a vertical junction extending perpendicularly between the first shield and the second shield and extending parallel to a media facing surface, and a RHB bulk layer disposed adjacent to the vertical junction. The magnetic read head assembly further comprises a DFL structure disposed adjacent to the vertical junction of the RHB structure, the DFL structure formed by milling into the first shield a second depth less than the first depth by about 10 nm to about 15 nm. The DFL structure comprises a first free layer disposed adjacent to the RHB bulk layer substantially perpendicular from the media facing surface to the vertical junction of the RHB structure, and a second free layer disposed over the first free layer, the second free layer being disposed adjacent to the RHB bulk layer substantially perpendicular from the media facing surface to the vertical junction of the RHB structure.

In another embodiment, a magnetic read head assembly comprises a first shield, a second shield disposed over the first shield, a RHB structure disposed between the first shield and the second shield recessed from a media facing surface, the RHB structure formed by milling into the first shield a first depth. The RHB structure has a first stripe height. The magnetic read head assembly further comprises a TMR sensor disposed adjacent to the RHB structure at the media facing surface, the TMR sensor being formed by milling into the first shield a second depth different than the first depth. The TMR sensor comprises a first free layer having a second stripe height from the media facing surface to the RHB structure, the second stripe height being less than the first stripe height, and a second free layer disposed over the first free layer, the second free layer having a third stripe height from the media facing surface to the RHB structure, wherein the second stripe height is substantially equal to the third stripe height.

In another embodiment, a method of forming a magnetic read assembly comprises forming a DFL structure over a first shield at a media facing surface, ion milling the DFL structure at a first angle and a first voltage, ion milling the DFL structure at a second angle and a second voltage, ion milling the DFL structure at a third angle and a third voltage, forming an insulation layer adjacent to and in contact with the DFL structure, the insulation layer being recessed from the media facing surface, and forming a RHB structure over the insulation layer and adjacent to the DFL structure. The RHB structure comprises a RHB seed layer disposed at a fourth angle, a RHB bulk layer disposed at a fifth angle over the RHB seed layer, and a RHB capping layer disposed over the RHB bulk layer. The method further comprises forming a second shield over the RHB capping layer and the DFL structure.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 6A-6F are schematic illustrations of a method of forming and defining a stripe height of the DFL read head of FIG. 4B, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

It is to be understood that the magnetic recording head discussed herein is applicable to a data storage device such as a hard disk drive (HDD) as well as a tape drive, such as a tape embedded drive (TED) or an insertable tape media drive. An example TED is described in co-pending patent application entitled "Tape Embedded Drive", U.S. patent application Ser. No. 16/365,034, filed Mar. 31, 2019 and assigned to the same assignee of the instant application. Any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

It is to be understood that embodiments described herein is not limited to a single dual free layer (DFL) read head and may be applicable to a two-dimensional magnetic recording (TDMR) DFL read head.

The present disclosure generally relates to a read head assembly having a dual free layer (DFL) structure disposed between a first shield and a second shield at a media facing surface. The read head assembly further comprises a rear hard bias (RHB) structure disposed adjacent to the DFL structure recessed from the media facing surface, where an insulation layer separates the RHB structure from the DFL structure. The insulation layer is disposed perpendicularly between the first shield and the second shield. The DFL structure comprises a first free layer and a second free layer having equal stripe heights from the media facing surface to the insulation layer. The RHB structure comprises a seed layer, a bulk layer, and a capping layer. The capping layer and the insulation layer prevent the bulk layer from contacting the second shield.

Figure 1:
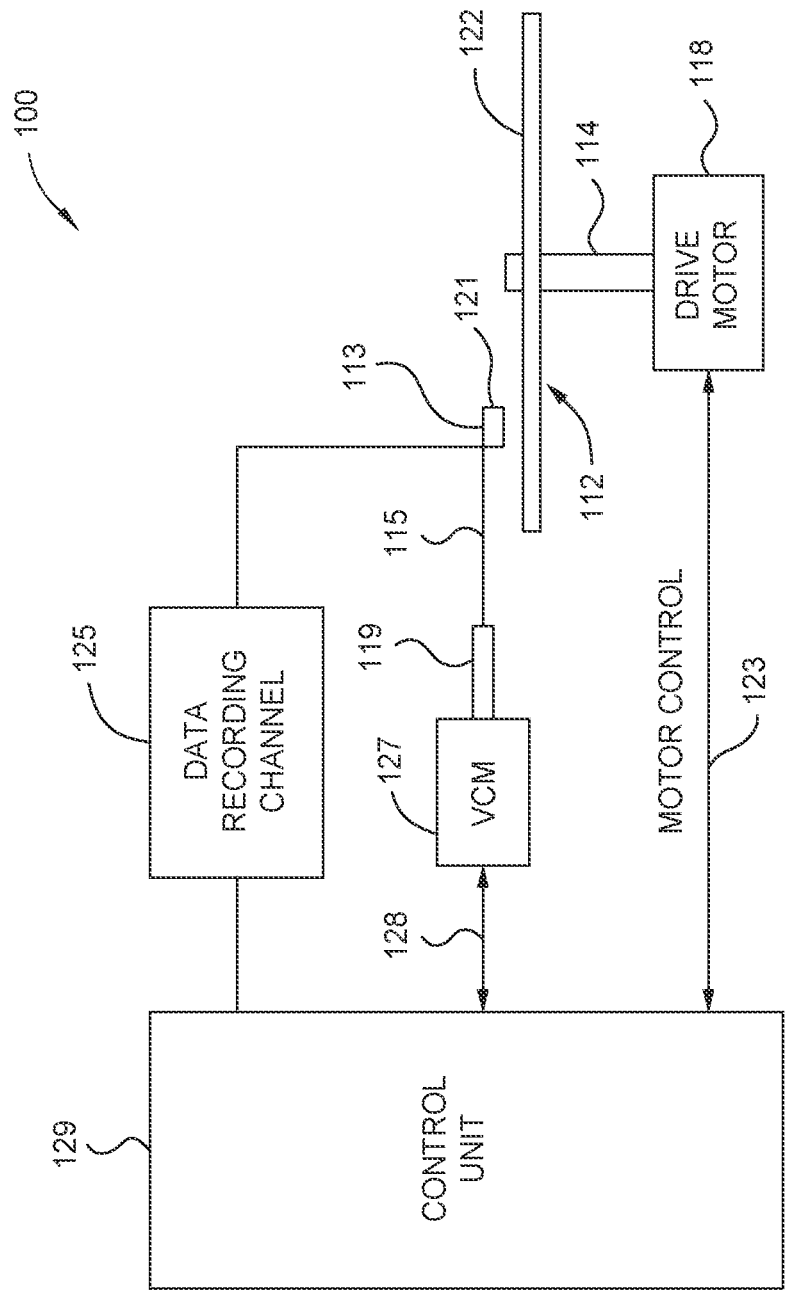
FIG. 1 is a schematic illustration of a magnetic media drive including a magnetic write head and a magnetic read head, according to various embodiments.

FIG. 1 is a schematic illustration of a magnetic media drive 100 including a magnetic write head and a magnetic read head, according to disclosed embodiments. The magnetic media drive 100 may be a single drive/device or comprise multiple drives/devices. The magnetic media drive 100 includes a magnetic recording medium, such as one or more rotatable magnetic media 112 supported on a spindle 114 and rotated by a drive motor 118. For the ease of illustration, a single disk drive is shown according to one embodiment. The magnetic recording on each magnetic media 112 is in the form of any suitable patterns of data tracks, such as annular patterns of concentric data tracks (not shown) on the magnetic media 112.

The slider 113 is positioned near the magnetic media 112. In some embodiments, the slider 113 is a plurality of sliders, where each slider 113 of the plurality of sliders supports one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the magnetic disk drive 100, the rotation of the magnetic media 112 generates an air bearing between the slider 113 and the media surface 122 which exerts an upward force or lift on the slider 113. The air bearing thus counter-balances the slight spring force of suspension 115 and supports slider 113 off and slightly above the magnetic media 112 surface by a small, substantially constant spacing during normal operation.

The various components of the magnetic disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position the slider 113 to the desired data track on the magnetic media 112. Write and read signals are communicated to and from write and read heads on the magnetic head assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
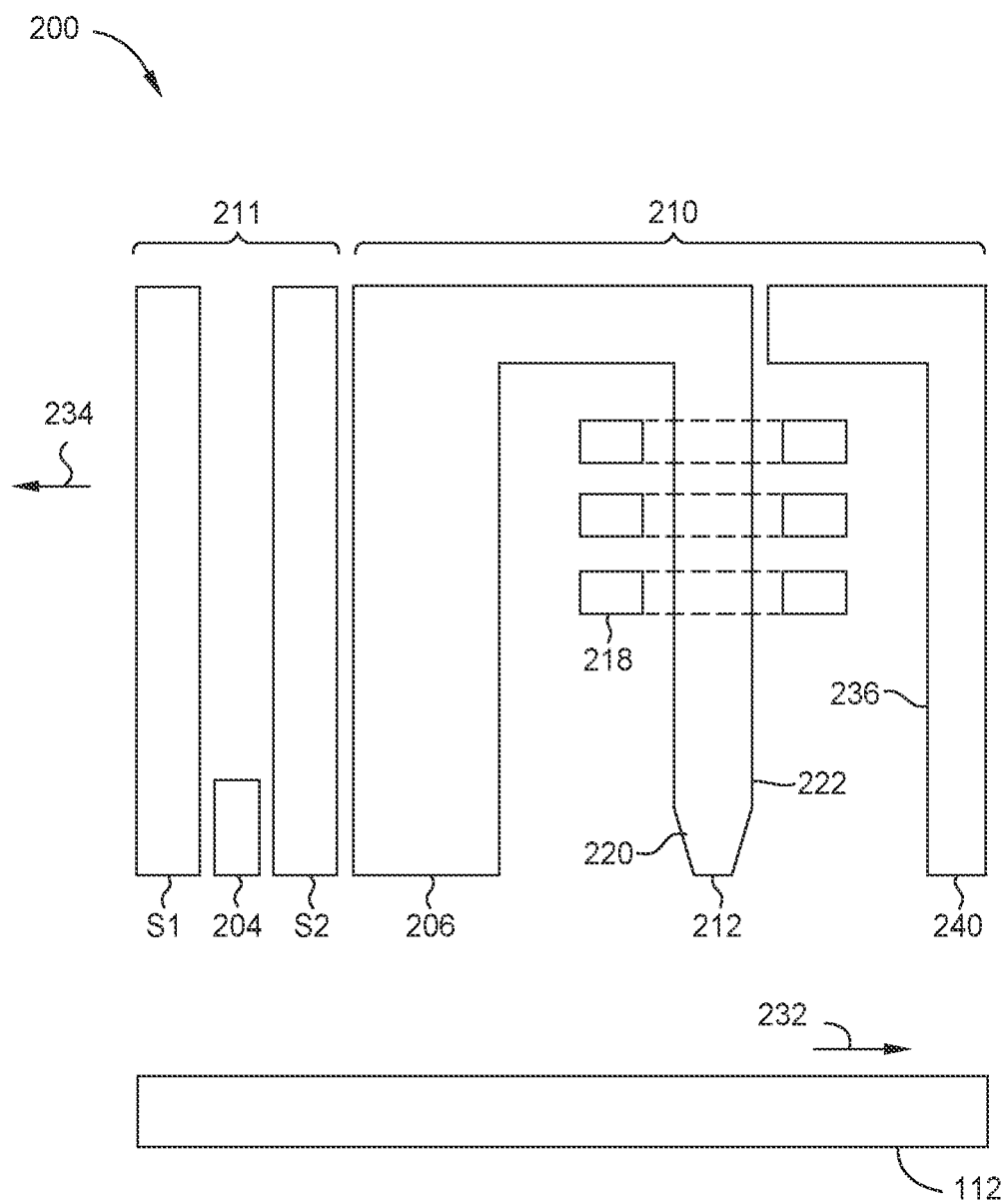
FIG. 2 is a schematic illustration of a cross-sectional side view of a head assembly facing a magnetic storage medium, according to various embodiments.

FIG. 2 is a schematic illustration of a cross-sectional side view of a head assembly 200 facing a magnetic storage medium, such as the magnetic media 112, according to disclosed embodiments. The head assembly 200 may correspond to the magnetic head assembly 121 described in FIG. 1. The head assembly 200 includes a media facing surface (MFS) 212, such as an air bearing surface (ABS), a magnetic write head 210, and a magnetic read head 211. The head assembly 200 is mounted such that the MFS 212 is facing the magnetic media 112. In FIG. 2, the magnetic media 112 moves past the write head 210 in the direction indicated by the arrow 232 and the head assembly 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap (not shown) and a leading gap (not shown) may be in contact with the main pole and a leading shield (not shown) may be in contact with the leading gap.

A recording magnetic field is generated from the main pole 220 and the trailing shield 240 helps making the magnetic field gradient of the main pole 220 steep. The main pole 220 may be a magnetic material such as a FeCo alloy. The main pole 220 may include a trailing surface 222 that may be parallel to a leading surface 236 of the trailing shield 240. The main pole 220 may be a tapered write pole (TWP) with a trailing edge taper (TET) configuration. In one embodiment, the main pole 220 has a saturated magnetization (Ms) of 2.4 Teslas (T) and a thickness of about 300 nanometers (nm). The main pole 220 may comprise ferromagnetic materials, typically alloys of one or more of Co, Fe and Ni. The trailing shield 240 may be a magnetic material such as NiFe alloy. In one embodiment, the trailing shield 240 has an Ms of about 1.2 T to about 1.6 T.

It is to be understood that a "dual free layer (DFL) read head" and a "magnetic read head" may be used interchangeably in the descriptions herein, for exemplary purposes.

Figure 3:
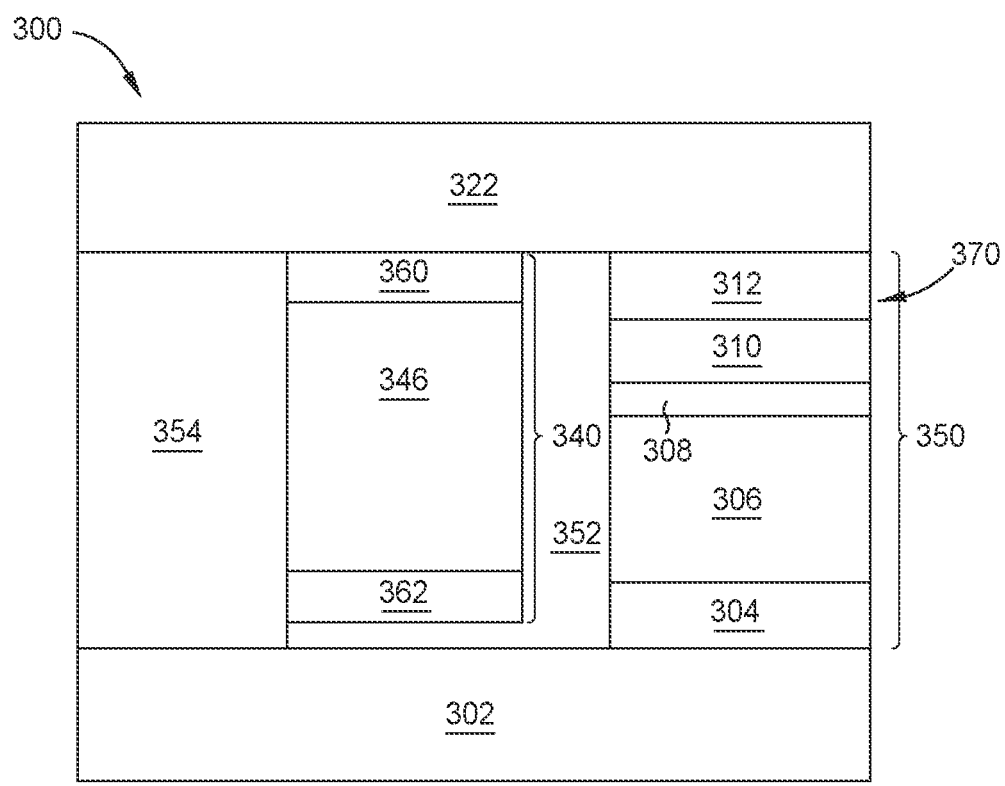
FIG. 3 is a schematic illustration of a magnetic read head, according to various embodiments.
Figure 3:
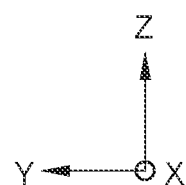

FIG. 3 is a schematic illustration of a single magnetic read head 300 shown from an APEX view, according to disclosed embodiments. The single magnetic read head 300 comprises a first shield (S1) 302, a seed layer 304 disposed over the S1 302, a first free layer (FL) 306 disposed over the seed layer 304, a barrier layer 308 disposed over the first FL 306, a second FL 310 disposed over the barrier layer 308, a capping layer 312 disposed over the second FL 310, and a second shield (S2) 322 disposed over the capping layer. The seed layer 304, the first FL 306, the barrier layer 308, the second FL 310, and the capping layer 312 are collectively referred to as the DFL structure 350. In the embodiments discussed herein, the DFL structure 350 may be referred to as a MTJ stack or a tunnel magneto-resistive (TMR) sensor, interchangeably, for exemplary purposes.

The S1 302 includes a magnetic permeable and electrically conductive material selected from the group that includes NiFe, CoFe, NiFeCo, alloys, and their combinations. The S2 322 includes a magnetic permeable and electrically conductive material selected from the same group of materials as S1 302, or the same material exchange biased by a manganese based antiferromagnet such as IrMn, PtMn, and NiMn, or the combination of the two. The thickness of each of the S1 302 and the S2 322 may individually be between about 10 nm and about 500 nm. The S1 302 and S2 322 are deposited by well-known deposition methods such as electroplating, electroless plating, or sputtering, or their combinations. Additionally, it is to be understood that while NiFe, CoFe, NiFeCo, IrMn, PtMn and NiMn have been exemplified as the S1 302 and S2 322 materials, other materials are contemplated and the embodiments discussed herein are not limited to NiFe, CoFe, NiFeCo, IrMn, PtMn and NiMn for the S1 302 and the S2 322.

The seed layer 304 is formed over the S1 302 to magnetically decouple the first FL 306 from the S1 302. The seed layer 304 is deposited by well-known deposition methods such as sputtering. The seed layer 304 includes a material selected from the group that includes tantalum (Ta), ruthenium (Ru), titanium (Ti) and their multilayers or alloys thereof. The seed layer 304 may have a thickness between about 10 Angstroms to about 50 Angstroms. Additionally, it is to be understood that while Ta, Ru, Ti and their multilayers and alloys have been exemplified as the seed layer 304 materials, other materials are contemplated and the embodiments discussed herein are not limited to Ta, Ru, or Ti or their multilayers or alloys for the seed layer 304. For example, suitable materials for the seed layer 304 may also include non-magnetic alloys of Co, Fe, and Ni with added elements such as Hf and Zr. Examples include CoHf and CoZr.

The first FL 306 is formed on the seed layer 304. The first FL 306 may be formed by well-known deposition methods such as sputtering. The first FL 306 includes a CoFexB/CoFe multilayer stack. The CoFe layer may have a thickness between about 3 Angstroms to about 10 Angstroms. The CoFexB layer may have a thickness between about 30 Angstroms to about 100 Angstroms, where "x" is between about 0 and about 1 (i.e., the layer may have a non-stoichiometric amount of Fe). Additionally, it is to be understood that while CoFexB/CoFe has been exemplified as the first FL 306 material, other materials are contemplated and the embodiments discussed herein are not limited to CoFexB/CoFe for the first FL 306.

The barrier layer 308 is formed on the first FL 306. The barrier layer 308 includes a material such as magnesium oxide (MgO) with a thickness between about 10 Angstroms to about 20 Angstroms. It is to be understood that while MgO is exemplified as the barrier layer 308, other insulating materials are contemplated and the embodiments discussed herein are not limited to MgO for the barrier layer 308.

The second FL 310 is formed on the barrier layer 308. The second FL 310 may be formed by well-known deposition methods such as sputtering. The second FL 310 includes a CoFe/CoFexB multilayer stack. The CoFe layer may have a thickness between about 3 Angstroms to about 10 Angstroms. The CoFexB layer may have a thickness between about 30 Angstroms to about 100 Angstroms and "x" between about 0 and about 1 (i.e., the layer may have a non-stoichiometric amount of Fe). Additionally, it is to be understood that while CoFe/CoFexB has been exemplified as the second FL 310 material, other materials are contemplated and the embodiments discussed herein are not limited to CoFe/CoFexB for the second FL 310. The magnetic moments for the first FL 306 and the second FL 310 may be antiparallel due to the antiparallel biasing from synthetic antiferromagnetic (SAF) soft biases (SBs) or side shields disposed adjacent to both sides of the MFS 370 of the DFL structure 350.

The capping layer 312 is formed on the second FL 310 to magnetically decouple the second FL 310 from the S2 322. The capping layer 312 may be formed by well-known deposition methods such as sputtering. The capping layer 312 includes a material selected from the group that includes tantalum (Ta), ruthenium (Ru), titanium (Ti), other non-magnetic, electrically conductive materials and their multilayers. The capping layer 312 may have a thickness between about 10 Angstroms to about 100 Angstroms. Additionally, it is to be understood that while Ta, Ru, Ti and their multilayers have been exemplified as the capping layer 312 materials, other materials are contemplated and the embodiments discussed herein are not limited to Ta, Ru, or Ti or their multilayers for the capping layer 312. For example, suitable materials for the capping layer 312 may also include non-magnetic alloys of Co, Fe, and Ni with added elements such as Hf and Zr. Examples include CoHf and CoZr.

The single magnetic read head 300 further comprises a rear hard bias (RHB) structure 340 disposed behind the DFL structure 350 recessed from the MFS 370. The RHB structure 340 comprises a RHB seed layer 362, a RHB bulk layer 346 disposed over the RHB seed layer 362, and a RHB capping layer 360 disposed between the RHB bulk layer 346 and the S2 322. The RHB bulk layer 346 generates a magnetic field pointing away from the following layers: the first FL 306, the barrier layer 308, the second FL 310, and the capping layer 312. Stated another way, the magnetic field of the RHB bulk layer 346 is along an axis that is perpendicular to the MFS 370 plane. The RHB bulk layer 346 may comprise cobalt platinum (CoPt), and is magnetically decoupled from the S2 322 by inserting the RHB capping layer 360 or a non-magnetic layer between the RHB bulk layer 346 and the S2 322. Additionally, it is to be understood that while CoPt has been exemplified as the RHB bulk layer material, other materials are contemplated and the embodiments discussed herein are not limited to CoPt for the RHB bulk layer 346. The RHB bulk layer 346 may have a thickness between about 150 Angstroms and about 300 Angstroms. The RHB bulk layer 346 may be deposited by well-known deposition methods such as sputtering.

The RHB capping layer 360 may include a material selected from the group that includes tantalum (Ta), ruthenium (Ru), titanium (Ti), alumina ($Al_2O_3$), silicon dioxide, and other non-magnetic materials. Additionally, it is to be understood that while Ta, Ru, Ti, $Al_2O_3$, silicon dioxide have been exemplified as the RHB capping layer 360 materials, other materials are contemplated and the embodiments discussed herein are not limited to Ta, Ru, Ti, $Al_2O_3$, silicon dioxide for the RHB capping layer 360. The RHB capping layer 360 may have a thickness between about 10 Angstroms and about 100 Angstroms. In some embodiments, the RHB capping layer 360 may have a similar thickness as the capping layer 312. The RHB capping layer 360 may be deposited by well-known deposition methods such as sputtering.

The RHB bulk layer 346 is deposited on the RHB seed layer 362. The RHB seed layer 362 includes a material selected from the group that includes tantalum (Ta), tungsten (W), ruthenium (Ru), nitrides and alloys thereof. Additionally, it is to be understood that while Ta, W, and Ru have been exemplified as the RHB seed layer 362 materials, other materials are contemplated and the embodiments discussed herein are not limited to Ta, W, or Ru for the RHB seed layer 362. The RHB seed layer 362 may be deposited by well-known deposition methods such as sputtering. Furthermore, the RHB seed layer 362 may have a thickness between about 26 Angstroms and about 35 Angstroms. Additionally, it is contemplated that the RHB seed layer 362 may comprise multiple layers.

A first insulation layer 352 fills in the space between the S1 302, the DFL structure 350, the RHB structure 340, and the S2 322. As such, the first insulation layer 352 is disposed between the S1 302 and the S2 322, and between the DFL structure 350 and the RHB structure 340. Suitable materials for the first insulation layer 352 include dielectric materials such as aluminum oxide, magnesium oxide, silicon oxide, silicon nitride, and their multilayers. The first insulation layer 352 may be formed by well-known deposition methods such as sputtering and atomic layer chemical vapor deposition. The first insulation layer 352 may have a thickness between about 10 Angstroms and about 40 Angstroms.

A second or a bulk insulation layer 354 fills in the space between S1 302, the RHB structure 340, and the S2 322. As such, the second insulation layer 354 is disposed between the S1 302 and the S2 322, and behind the RHB structure 340. Suitable materials for the second insulation layer 354 include dielectric materials such as aluminum oxide, silicon oxide, and their multilayers. The second insulation layer 354 may be formed by well-known deposition methods such as sputtering. The second insulation layer 354 may have a thickness between about 400 Angstroms and about 800 Angstroms.

Figure 4A:
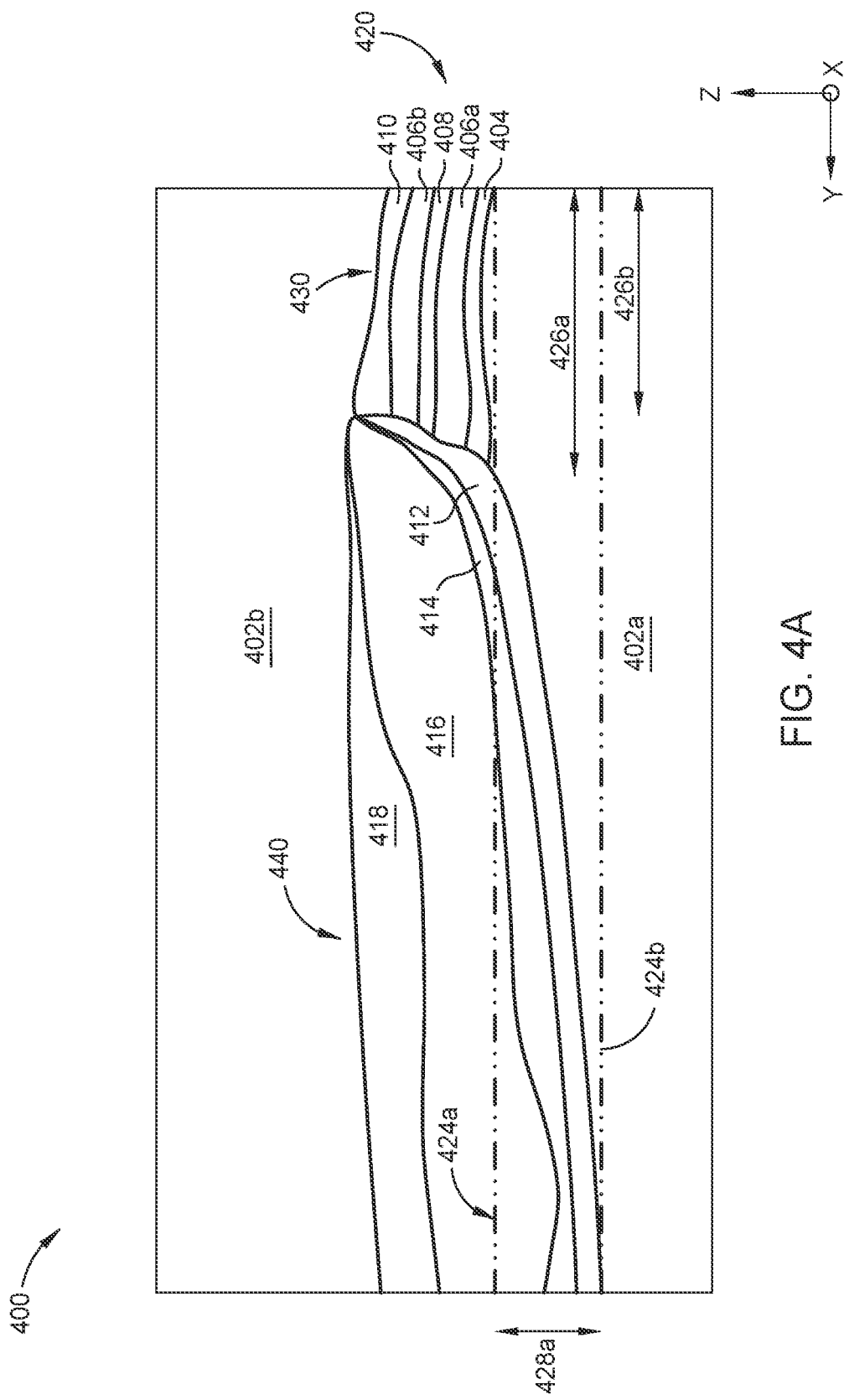
FIGS. 4A and 4B are schematic illustrations of dual free layer (DFL) read heads, according to various embodiments.
Figure 4B:
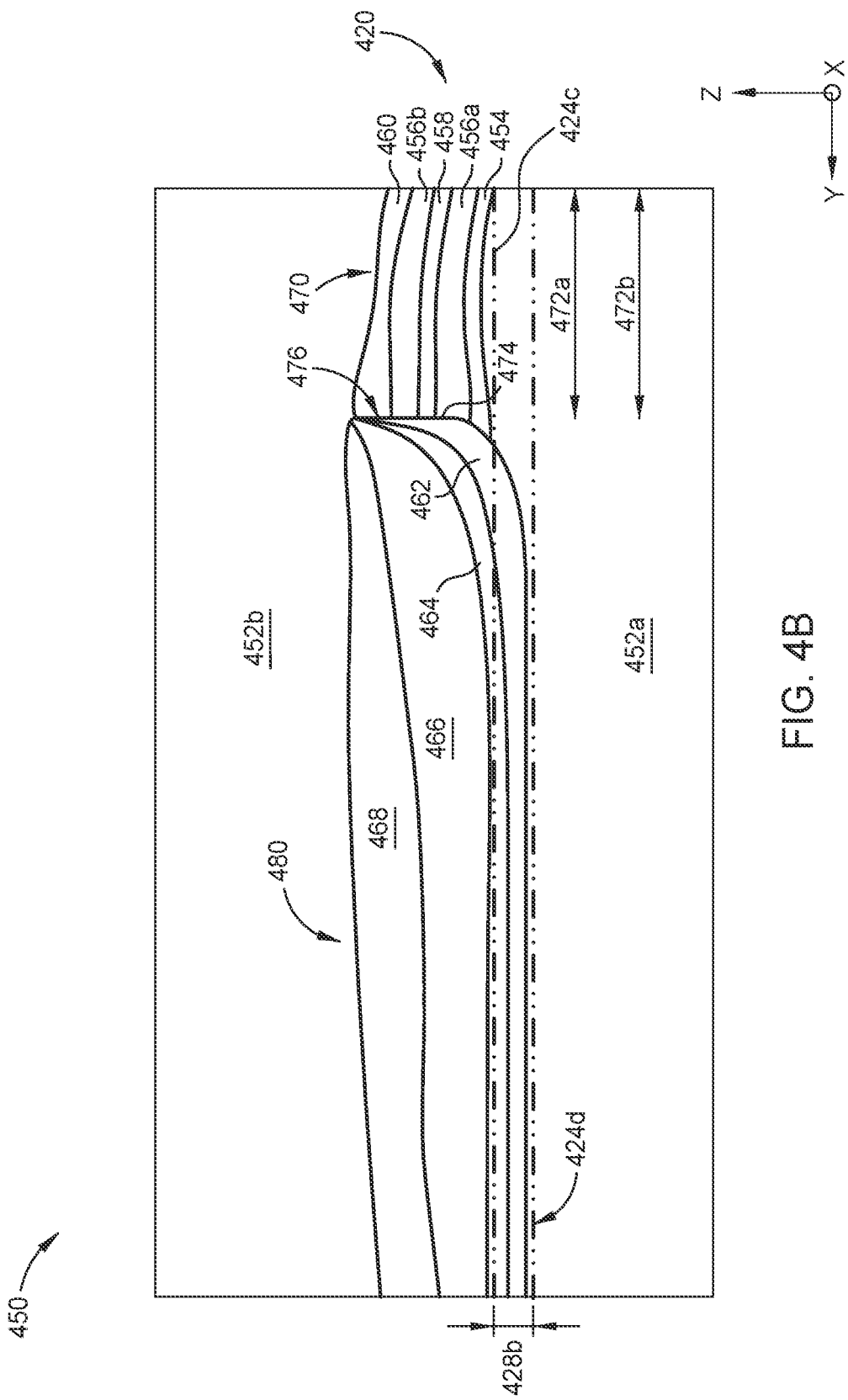
Figure 4C:
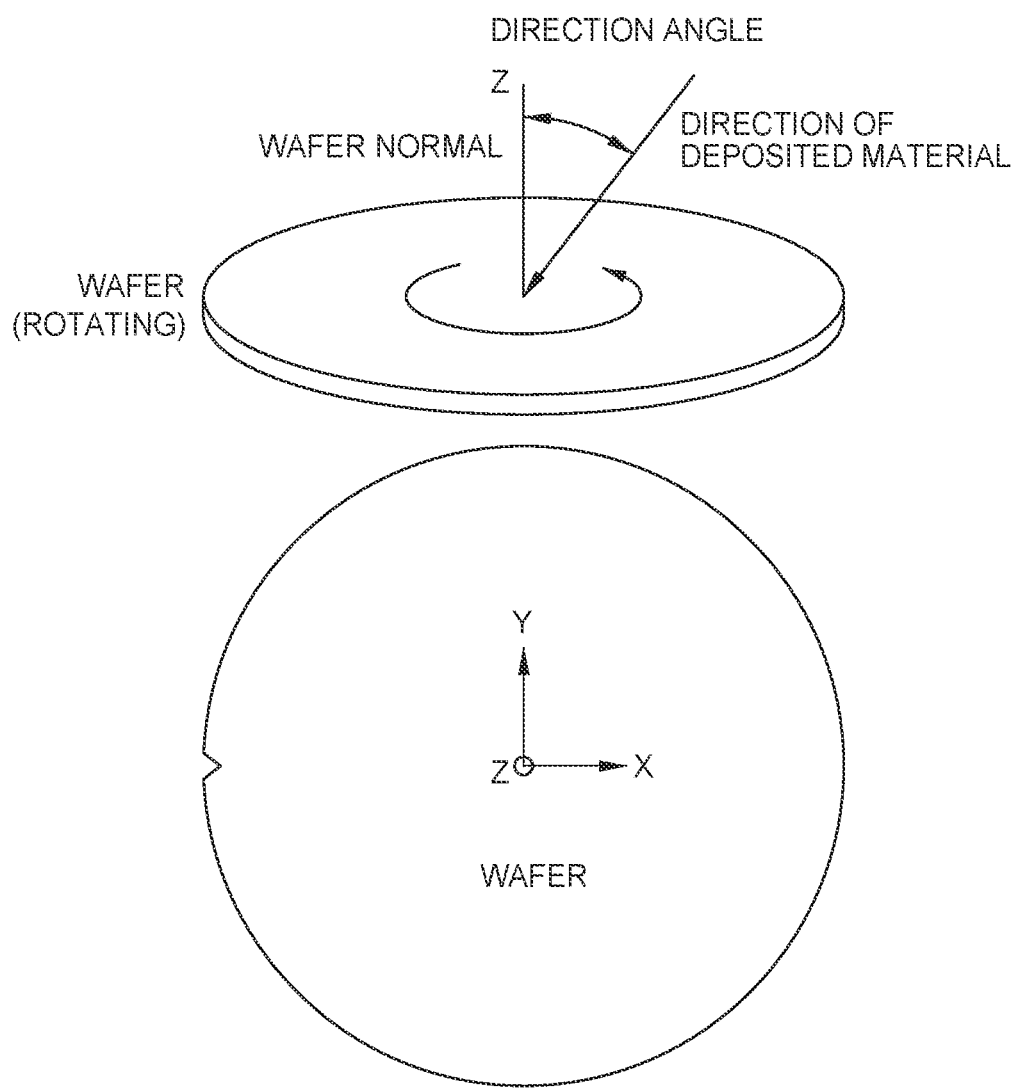
FIG. 4C is a schematic illustrating angles of deposited materials of the DFL read heads of FIGS. 4A-4B.

FIGS. 4A and 4B are schematic illustrations of DFL read heads 400, 450, respectively, according to various embodiments. FIG. 4C is a schematic illustrating angles of deposited materials of the DFL read heads 400, 450 of FIGS. 4A-4B. Aspects of the DFL read heads 400, 450 may be similar to the read head 300 of FIG. 3, and as such, the same materials listed above for the various layers may be the same. The DFL read head 400 of FIG. 4A comprises a first shield (S1) 402a, a second shield (S2) 402b, a seed layer 404, a first FL 406a, a barrier layer 408, a second FL 406b, and a capping layer 410. The seed layer 404, the first FL 406a, the barrier layer 408, the second FL 406b, and the capping layer 410 collectively form a DFL structure 430 or a TMR sensor. The line 424a illustrates the bottom of the seed layer 404 or a milling depth of the DFL structure 430. The DFL read head 400 further comprises a RHB seed layer 414, a RHB bulk layer 416, a RHB capping layer 418, and an insulation layer 412. The RHB seed layer 414, the RHB bulk layer 416, and the RHB capping layer 418 collectively form a RHB structure 440. The DFL structure 430 is disposed adjacent to the RHB structure 440. A portion of the insulation layer 412 is disposed between the DFL structure 430 and the RHB structure 440.

During formation of the DFL read head 400 of FIG. 4A, the S1 402a is milled to a first depth illustrated by line 424b for deposition of the RHB seed layer 414. The RHB seed layer 414 may be deposited over the insulation layer 412, where an angle of deposition, relative to the z-axis of the surface normal to the S1 402a (i.e., a plane disposed perpendicular to the MFS 420), is between about 10° and about 45°, such as about 40°, like shown in FIG. 4C. The RHB bulk layer 416 may be deposited over the RHB seed layer 414 at an angle of deposition, relative to the surface normal to the S1 402a, of between about 35° and about 45°, such as about 40°. The RHB seed layer 414 thickness may be between about 25 Angstroms and about 55 Angstroms, such as about 35 Angstroms.

Similarly, the DFL read head 450 of FIG. 4B comprises a first shield (S1) 452a, a second shield (S2) 452b, a seed layer 454, a first FL 456a, a barrier layer 458, a second FL 456b, and a capping layer 460. The seed layer 454, the first FL 456a, the barrier layer 458, the second FL 456b, and the capping layer 460 collectively form a DFL structure 470 or a TMR sensor. The line 424c illustrates the bottom of the seed layer 454 or a milling depth of the DFL structure 470. The DFL read head 450 further comprises a RHB seed layer 464, a RHB bulk layer 466, a RHB capping layer 468, and an insulation layer 462. The RHB seed layer 464, the RHB bulk layer 466, and the RHB capping layer 468 collectively form a RHB structure 480. The DFL structure 470 is disposed adjacent to the RHB structure 480. A portion of the insulation layer 462 is disposed between the DFL structure 470 and the RHB structure 480.

During formation of the DFL read head 450 of FIG. 4B, the S1 452a is milled to a second depth illustrated by line 424d for deposition of the RHB seed layer 462. The RHB seed layer 464 may be deposited over the insulation layer 462, where an angle of deposition, relative to the z-axis or the surface normal to the S1 452a (i.e., a plane disposed perpendicular to the MFS 420), is between about 35° and about 45°, such as about 40°, as shown in FIG. 4C. The RHB bulk layer 466 may be deposited over the RHB seed layer 464 at an angle of deposition, relative to the surface normal to the S1 402a, of between about 35° and about 45°, such as about 40°. The RHB seed layer 464 thickness may be between about 25 Angstroms and about 55 Angstroms, such as about 35 Angstroms. Furthermore, the DFL read head 450 includes a vertical junction 476 such that a first surface 474 of the RHB structure 480 is perpendicular to the DFL structure 470. The first surface 474 of the RHB structure 480 of the DFL read head 450 is a portion of the insulation layer 462 that is disposed parallel to the MFS 420 (i.e., perpendicular to each layer of the DFL structure 470). The line 424a further illustrates a junction milling depth of the vertical junction 476.

The distance between the bottom of the seed layer 404 illustrated by line 424a and the first depth illustrated by line 424b shows the conventional milling depth 428a of the DFL read head 400 of FIG. 4A. The conventional milling depth 428a of the RHB structure 440 is between about 20 nm to about 30 nm, such as about 25 nm. As such, the bottom of the DFL structure 430 is vertically offset in the z-direction or unaligned with the bottom of the RHB structure 440 by about 20 nm to about 30 nm. Conversely, the distance between the bottom of the seed layer 454 illustrated by line 424c and the second depth illustrated by line 424d shows the milling depth 428b of the DFL read head 450 of FIG. 4B. The milling depth 428b of the RHB structure 480 is between about 10 nm to about 15 nm, such as about 12 nm. Thus, the bottom of the DFL structure 470 is vertically offset in the z-direction or unaligned with the bottom of the RHB structure 480 by about 10 nm to about 15 nm. In other words, the conventional milling depth 428a of the DFL read head 400 is about twice as large as the milling depth 428b of the DFL read head 450.

Due to the vertical junction 476 of the DFL read head 450, a stripe height 472a of the first FL 456a is substantially equal to a stripe height 472b of the second FL 456b. As a comparison, the stripe height 426a of the first FL 406a of the DFL read head 400 is greater than the stripe height 426b of the second FL 406b of the DFL read head 400. Similarly, the DFL read head 450 has a shallower milling depth 428b into the S1 452a than the milling depth into the S1 402a of the DFL read head 400, as shown by the lines 424a, 424b, 424d.

For example, the second depth illustrated by line 424d of the DFL read head 450 is substantially aligned with or parallel to a bottom surface of the insulation layer 462 or a top surface of the S1 452a, and is disposed perpendicular to the MFS 420, whereas the insulation layer 412 of the DFL read head 400 is disposed at an angle from both the first depth illustrated by line 424b and the MFS 420, as the first depth illustrated by line 424b contacts only a small portion of the insulation layer 412. As such, the insulation layer 412 is unaligned with the first depth illustrated by line 424b, resulting in the insulation layer 412 being neither disposed parallel to the S1 402a nor perpendicular to the MFS 420. Moreover, the milling depth illustrated by line 424a cuts through the insulation layer 412, the RHB seed layer 414, and the RHB bulk layer 416 of the DFL read head 400, wherein as the milling depth illustrated by line 424c is substantially aligned with a surface of the RHB bulk layer 466 of the DFL read head 450, which is disposed perpendicular to both the vertical junction 476 and the MFS 420.

In the embodiment of FIG. 4B, by having more RHB bulk layer 466 placed adjacent to DFL structure 470, specifically adjacent to the first FL 456a and the second FL 456b, the magnetic field experienced by the first FL 456a and the second FL 456b may be increased. The vertical junction 476 of the DFL read head 450 enables a greater portion of the RHB bulk layer 466 to be disposed adjacent to the first FL 456a and the second FL 456b than that of the DFL read head 400. Furthermore, the vertical junction 476 may improve the sealing of the RHB bulk layer 466 from the S2 452b such that the magnetic field generated by the RHB bulk layer 466 does not shunt by the S2 452b. Thus, the RHB capping layer 468 and the insulation layer 462 may effectively seal the magnetic field generated by the RHB bulk layer 466 from the S2 452b.

Figure 5:
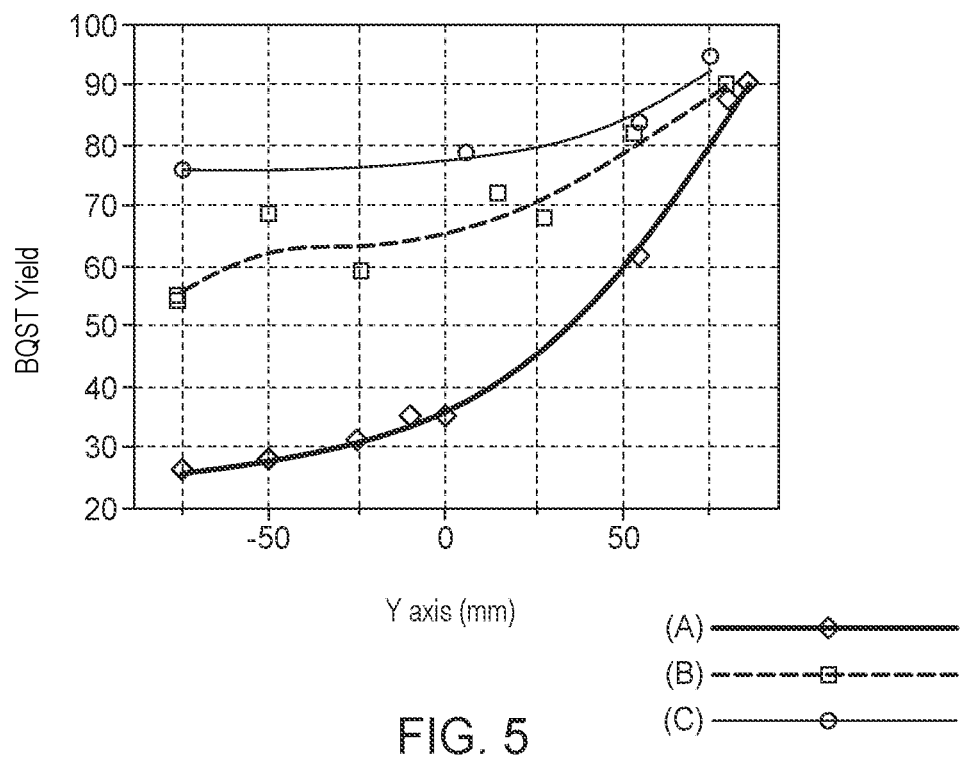
FIG. 5 is a graph illustrating the performance improvements of various DFL read heads, according to various embodiments.

FIG. 5 is a graph 500 illustrating the performance improvements of various DFL read heads, such as the DFL read heads of FIGS. 4A-4B, according to disclosed embodiments. The y-axis describes the Bar Quasi Static Test (BQST) yield of each DFL read head with respect to varying RHB structure dimensions. The x-axis describes a location of the DFL read head from a wafer top (positive y-coordinates) to a wafer bottom (negative y-coordinates). Each of the DFL read heads compared in the graph 500 comprise a DFL structure and a RHB structure, such as shown in the DFL read heads of FIGS. 3-4B. It is to be understood that while CoPt is described herein as the RHB bulk layer material of the RHB structure of the DFL read heads, other materials are contemplated, and the embodiments discussed herein are not limited to CoPt for the RHB bulk layer material.

In case (A), the RHB seed layer is deposited at a 10° angle relative to the z-axis or the surface normal to the first shield (i.e., a plane disposed perpendicular to the MFS), and the CoPt layer (RHB bulk layer) is deposited at a 25° angle over the RHB seed layer. The RHB seed layer of case (A) may have a thickness of about 46 Angstroms. In case (B), the RHB seed layer is deposited at a 10° angle relative to the surface normal to the first shield and the CoPt layer (RHB bulk layer) is deposited at a 40° angle over the RHB seed layer. The RHB seed layer of case (B) may have a thickness of about 46 Angstroms. In case (C), the RHB seed layer is deposited at a 40° angle relative to the surface normal to the first shield and the CoPt layer (RHB bulk layer) is deposited at a 40° angle over the RHB seed layer. The RHB seed layer of case (C) may have a thickness of about 35 Angstroms.

The BQST yield of the embodiment illustrated in case (C) shows a significant improvement than the BQST yield of case (A) and the BQST yield of case (B). For example, the BQST yield for case (C) ranges from about 95% to about 75% when the y-coordinate changes from about 80 mm to about −75 mm (i.e., when the DFL read heads are tested from a location at a wafer top of 80 mm to a location at the wafer bottom of −75 mm). Comparatively, the BQST yield for case (A) ranges from about 90% to about 25% when the y-coordinate changes from about 80 mm to about −75 mm, and the BQST yield for case (B) ranges from about 90% to about 55% when the y-coordinate changes from about 80 mm to about −75 mm (i.e., when the DFL read heads are tested from a location at a wafer top of 80 mm to a location at the wafer bottom of −75 mm). Thus, by having a thinner RHB seed layer deposited at about a 40° angle, and a CoPt layer deposited over the RHB seed layer at about a 40° angle, the effect of the magnetic field generated by the CoPt layer experienced by the first FL and the second FL of the DFL read head may be increased and more uniform across the wafer.

FIGS. 6A-6F are schematic illustrations of a method of forming and defining a stripe height of the DFL read head 600, according to disclosed embodiments. The DFL read head 600 may be the DFL read head 300 of FIG. 3 or the DFL read head 450 of FIG. 4B. While different reference numerals may be used in FIGS. 6A-6F, the materials of the layers forming the DFL read head 450 are the same as the materials of the magnetic read head 300 of FIG. 3 described above. FIGS. 6A-6F illustrate an APEX view of the DFL read head 600 as the DFL read head is being fabricated. FIG. 4C may be referenced in the description of FIGS. 6A-6F to illustrate the various angles and axis of deposited layers.

In FIG. 6A, a first seed layer 604 is deposited on a first shield 602, and a second seed layer 606 is deposited on the first seed layer 604. In one embodiment, the first seed layer 604 and the second seed layer 606 comprises the same materials. In another embodiment, the first seed layer 604 and the second seed layer 606 comprises different materials. The material of the first and the second seed layers 604, 606 may be any of the materials of the seed layer 304 of FIG. 3 previously described. A first FL 608a is deposited on the second seed layer 606, a barrier layer 610 is deposited on the first FL 608a, a second FL 608b is deposited on the barrier layer 610, and a first capping layer 612 is deposited on the second FL 608b. The second seed layer 606 (and in some embodiments, with the first seed layer 604), the first FL 608a, the barrier layer 610, the second FL 608b, and the first capping layer 612 collectively form a DFL structure 654 or a TMR sensor. The first FL 608a and the second FL 608b each have a substantially constant thickness in the z-direction. In some embodiments, the first FL 608a and the second FL 608b have the same thickness in the z-direction. A sacrificial layer 614 is deposited on the first capping layer 612 and a second capping layer 616 is deposited on the sacrificial layer 614. In one embodiment, the sacrificial layer 614 comprises NiFe. A first photoresist 618 is then deposited over the second capping layer 616, where one side of the first photoresist 618 is opened to expose the back portion 660 of the deposited structure 600A upon exposure and development.

In FIG. 6B, a first ion beam 620 is used to ion mill a first backside portion 640 of the deposited structure 600A of FIG. 6A at a first angle 652a between about 5° and about 12° from the z-axis or the surface normal to the deposited structure 600A, like shown in FIG. 4C. The ion milling using the first ion beam 620 may remove portions of the second capping layer 616, the sacrificial layer 614, the first capping layer 612, the second FL 608b, the barrier layer 610, the first FL 608a, the second seed layer 606, and the first seed layer 604 to form a partially milled structure 600B. Material 642 from the milled layers 604-616 may redeposit on one or more of the upper layers, such as on layers 606-618.

In FIG. 6C, a second ion beam 622a is used to ion mill a second backside portion 644 of the structure 600B of FIG. 6B to clean the redeposited material 642. The second ion beam 622a mills the structure at a second angle 652b between about 70° and about 85° from the z-axis or the surface normal to the first shield 602, like shown in FIG. 4C.

A third ion beam 622b is used to complete the cleaning of the structure 600C. The third ion beam 622b mills at a third angle 652c, where the second angle 652b and the third angle 652c are substantially equal (i.e., between about 70° and about 85° from the z-axis or the surface normal to the first shield 602). The third ion beam 622b may be used for a duration of about 30 seconds to about 300 seconds to sufficiently remove any remaining redeposited material 642 from the layers of the DFL structure 654. The third voltage of the third ion beam 622b is substantially less than the second voltage of the second ion beam 622a to avoid damaging the barrier layer 610 or any other layer of the DFL structure 654. A small portion of redeposited material 642 may remain on one or more of the upper layers, such as on layers 614-618, upon completion of the third ion milling. However, the third ion beam 622b removes any remaining redeposited material 642 from the layers of the DFL structure 654.

The ion milling may remove additional portions of the second capping layer 616, the sacrificial layer 614, the first capping layer 612, the second FL 608b, the barrier layer 610, the first FL 608a, the second seed layer 606, and the first seed layer 604. Each of the layers of the DFL structure 654 are milled by the first, second, and third ion beams 620, 622a, 622b to have a same length or stripe height 646 from the MFS 650. Thus, the first FL 608a and the second FL 608b have substantially equal stripe heights 646. In one embodiment, the stripe height 646 of the first FL 608a and the second FL 608b is between about 15 nm and about 50 nm.

In FIG. 6D, a thin insulation layer 624 is deposited by well-known methods, such as atomic layer chemical vapor deposition (ALD) or sputtering, like ion beam deposition (IBD) and physical vapor deposition (PVD). The insulation layer 624 is deposited over the first seed layer 604 and the first photoresist 618, and in contact with a backside 648 of the layers of the DFL structure 654, the sacrificial layer 614, the second cap layer 616, and the first photoresist 618. In one embodiment, the insulation layer 624 may comprise AlOx, MgO, SiNx, SiOx, or any other suitable insulation materials and their multilayers. Following the insulation layer 624 deposition, a RHB seed layer 626 is deposited at a fourth angle with respect to the z-axis or the surface normal to the first shield 602, like shown in FIG. 4C, over the insulation layer 624. A RHB bulk layer 628 is deposited at a fifth angle with respect to the surface normal to the first shield 602 over the RHB seed layer 626 to form the structure 600D. The fourth angle and the fifth angle may each individually be between about 10° and about 45°, such as about 40°.

The portion of the RHB bulk layer 628 aligned with the DFL structure 654 is deposited to have a consistent thickness (i.e., to cover the backside 648 of the first FL 608a and the second FL 608b evenly). Because the RHB bulk layer 628 has a thickness to cover the backside 648 of the first FL 608a and the second FL 608b evenly, the transverse bias may be increased, the bias on the first FL 608a and the second FL 608b may be equal, and the generated fields of the first FL 608a and the second FL 608b may reduce noise or instability during data storage device operation. The transverse bias may be increased, resulting in a more positive asymmetry. Furthermore, when the bias of both the first FL 608a and the second FL 608b are equal, the chance of instability (e.g., where the first FL is not anti-parallel to the second FL) decreases.

In FIG. 6E, portions of the structure 600D of FIG. 6D are removed by well-known methods such as photoresist liftoff with or without ion beam assist and chemical mechanical planarization (CMP). Specifically, the portion of the RHB bulk layer 628 disposed over the RHB seed layer 626 and the insulation layer 624 on the sidewall 662 of the first photoresist 618 is first removed by ion beam etching at a sixth angle (not shown) with respect to the z-axis or normal to the first shield 602, and followed by the deposition of a RHB capping layer 630 over the RHB bulk layer 628 and the RHB seed layer 626 to prevent the RHB bulk layer 628 from exposure to CMP. The portion of the RHB bulk layer 628 is removed such that the RHB seed layer 626 and the RHB bulk layer 628 have a height in the z-direction equal to a height of the DFL structure 654.

The portions of the layers, 630, 626 and 624 disposed on and adjacent to the sidewall 662 of the first photoresist 618 are then removed by ion beam etching at a seventh angle (not shown) to expose the first photoresist 618 for liftoff. The sixth angle and the seventh angle may each individually be between about 70° and about 85°, such as about 80°. The first photoresist 618 is removed, along with the layers 624, 626, 628, 630 disposed on the first photoresist 618 to form the structure 600E. The insulation layer 624 is disposed between the RHB capping layer 630 and the second cap layer 616 and the sacrificial layer 614. The RHB seed layer 626, the RHB bulk layer 628, and the RHB capping layer 630 collectively form a RHB structure 656. The RHB structure 656 extends along the y-axis and has a stripe height 664 between about 50 nm to about 1000 nm, such as about 250 nm.

In FIG. 6F, portions of the structure 600E of FIG. 6E are further removed by well-known methods such as CMP, photoresist liftoff, and ion beam etch. Specifically, the second cap layer 616 and the sacrificial layer 614 are removed, along with any remaining redeposited material 642. Additionally, portions of the insulation layer 624 and the RHB capping layer 630 aligned with the second cap layer 616 and at least a portion of the sacrificial layer 614 are removed. A DFL structure 654 is formed with a vertical junction 652 disposed parallel to the MFS 650 (i.e., parallel to the z-axis) and is separated electrically from the RHB structure 656 by the insulation layer 624.

A second shield 632 is then deposited over the RHB capping layer 630, the insulation layer 624, and the first capping layer 612 to form the DFL read head 600. The second shield 632 may be deposited by well-known methods such as sputtering. The RHB capping layer 630 and the insulation layer 624 prevent the RHB seed layer 626 and the RHB bulk layer 628 from directly contacting the second shield 632. As such, the RHB capping layer 630 and the insulation layer 624 effectively seal the RHB bulk layer 628 such that the magnetic field generated by the RHB bulk layer 628 is unable to shunt through the second shield 632.

By forming a vertical junction between the DFL structure and the RHB structure in a DFL read head, the first free layer and the second free layer of the DFL structure have an equal bias, stripe height, and a stronger magnetic field applied by the RHB structure to the DFL structure. The equal bias of the first and second free layers further reduces both magnetic noise and instability. As such, the transverse bias stability of the DFL read head is increased, thus improving the operation of the DFL read head.

In one embodiment, a magnetic read head assembly comprises a first shield, a second shield disposed over the first shield, and a RHB structure disposed between the first shield and the second shield, the RHB structure formed by milling into the first shield a first depth. The RHB structure comprises a vertical junction extending perpendicularly between the first shield and the second shield and extending parallel to a media facing surface, and a RHB bulk layer disposed adjacent to the vertical junction. The magnetic read head assembly further comprises a DFL structure disposed adjacent to the vertical junction of the RHB structure, the DFL structure formed by milling into the first shield a second depth less than the first depth by about 10 nm to about 15 nm. The DFL structure comprises a first free layer disposed adjacent to the RHB bulk layer substantially perpendicular from the media facing surface to the vertical junction of the RHB structure, and a second free layer disposed over the first free layer, the second free layer being disposed adjacent to the RHB bulk layer substantially perpendicular from the media facing surface to the vertical junction of the RHB structure.

The RHB structure comprises a RHB seed layer having a first thickness, the RHB bulk layer being disposed over the RHB seed layer. The RHB bulk layer has a second thickness. The RHB structure further comprises a RHB capping layer disposed over the RHB bulk layer, the RHB capping layer having a third thickness. The second thickness is substantially greater than the third thickness. The third thickness is substantially greater than the first thickness. The RHB structure further comprises an insulation layer, the insulation layer forming the vertical junction of the RHB structure. The insulation layer comprises at least one of aluminum oxide, magnesium oxide, silicon nitride, and silicon oxide. The RHB seed layer comprises at least one of tantalum and tungsten. The RHB bulk layer comprises cobalt platinum. The RHB capping layer comprises tantalum. The RHB structure has a stripe height between about 50 nm to about 1000 nm. The first free layer has a first stripe height and the second free layer has a second stripe height. The first stripe height and the second stripe height are substantially equal.

In another embodiment, a magnetic read head assembly comprises a first shield, a second shield disposed over the first shield, a RHB structure disposed between the first shield and the second shield recessed from a media facing surface, the RHB structure formed by milling into the first shield a first depth. The RHB structure has a first stripe height. The magnetic read head assembly further comprises a TMR sensor disposed adjacent to the RHB structure at the media facing surface, the TMR sensor being formed by milling into the first shield a second depth different than the first depth. The TMR sensor comprises a first free layer having a second stripe height from the media facing surface to the RHB structure, the second stripe height being less than the first stripe height, and a second free layer disposed over the first free layer, the second free layer having a third stripe height from the media facing surface to the RHB structure, wherein the second stripe height is substantially equal to the third stripe height.

The second stripe height and the third stripe height of the DFL structure are each between about 15 nm to about 50 nm. The first stripe height is between about 50 nm to about 1000 nm. The RHB structure comprises a RHB seed layer having a first thickness between about 26 Angstroms and about 46 Angstroms, a RHB bulk layer disposed over the RHB seed layer, the RHB bulk layer having a second thickness between about 150 Angstroms and about 300 Angstroms, and a RHB capping layer disposed over the RHB bulk layer, the RHB capping layer having a third thickness between about 30 Angstroms and about 100 Angstroms. The RHB structure further comprises an insulation layer disposed adjacent to the TMR sensor. The insulation layer extends perpendicular from the first shield to the second shield. The RHB capping layer and the insulation layer are disposed between the RHB bulk layer and the second shield. The difference between the first depth and the second depth is about 10 nm to about 15 nm.

In another embodiment, a method of forming a magnetic read assembly comprises forming a DFL structure over a first shield at a media facing surface, ion milling the DFL structure at a first angle and a first voltage, ion milling the DFL structure at a second angle and a second voltage, ion milling the DFL structure at a third angle and a third voltage, forming an insulation layer adjacent to and in contact with the DFL structure, the insulation layer being recessed from the media facing surface, and forming a RHB structure over the insulation layer and adjacent to the DFL structure. The RHB structure comprises a RHB seed layer disposed at a fourth angle, a RHB bulk layer disposed at a fifth angle over the RHB seed layer, and a RHB capping layer disposed over the RHB bulk layer. The method further comprises forming a second shield over the RHB capping layer and the DFL structure.

The insulation layer forms a vertical junction between the DFL structure and the RHB structure. The first angle is between about 5 degrees and about 12 degrees from a surface normal to a first plane disposed perpendicular to the media facing surface. The second angle is between about 70 degrees and about 85 degrees from the surface normal to the first plane. The third angle is between about 70 degrees and about 85 degrees from the surface normal to the first plane. The fourth angle is between about 10 degrees and about 45 degrees. The fifth angle is about 35 degrees and about 45 degrees. The DFL structure includes a first free layer and a second free layer. A first stripe height of the first free layer is substantially equal to a second stripe height of the second free layer. The RHB capping layer and the insulation layer are disposed between the second shield and the RHB bulk layer.

While the foregoing is directed to embodiments of the present disclosure, other and further embodiments of the disclosure may be devised without departing from the basic scope thereof, and the scope thereof is determined by the claims that follow.

What is claimed is:

1. A magnetic read head assembly, comprising:
   a first shield;
   a second shield disposed over the first shield;
   a rear hard bias (RHB) structure disposed between the first shield and the second shield, the RHB structure formed by milling into the first shield a first depth, wherein the RHB structure comprises:
      a vertical junction extending perpendicularly between the first shield and the second shield and extending parallel to a media facing surface;
      a RHB bulk layer disposed adjacent to the vertical junction;
      a RHB seed layer disposed below the RHB bulk layer and between the RHB bulk layer and the vertical junction; and
      a RHB capping layer disposed on the RHB bulk layer and in contact with the RHB seed layer; and
   a dual free layer (DFL) structure disposed adjacent to the vertical junction of the RHB structure, the DFL structure formed by milling into the first shield a second depth less than the first depth by about 10 nm to about 15 nm, wherein the RHB seed layer extends below the second depth of the DFL structure, and wherein the DFL structure comprises:
      a first free layer disposed adjacent to the RHB bulk layer substantially perpendicular from the media facing surface to the vertical junction of the RHB structure; and
      a second free layer disposed over the first free layer, the second free layer being disposed adjacent to the RHB bulk layer substantially perpendicular from the media facing surface to the vertical junction of the RHB structure.

2. The magnetic read head assembly of claim 1, wherein:
   the RHB seed layer has a first thickness;
   the RHB bulk layer has a second thickness; and
   the RHB capping layer has a third thickness.

3. The magnetic read head assembly of claim 2, wherein the second thickness is substantially greater than the third thickness, and wherein the third thickness is substantially greater than the first thickness.

4. The magnetic read head assembly of claim 1, wherein:
   the RHB seed layer comprises at least one of tantalum and tungsten;
   the RHB bulk layer comprises cobalt platinum; and
   the RHB capping layer comprises tantalum.

5. The magnetic read head assembly of claim 1, wherein the RHB structure further comprises an insulation layer, the insulation layer forming the vertical junction of the RHB structure, wherein the insulation layer comprises at least one of aluminum oxide, magnesium oxide, silicon nitride, and silicon oxide.

6. The magnetic read head assembly of claim 1, wherein the RHB structure has a stripe height between about 50 nm to about 1000 nm.

7. The magnetic read head assembly of claim 1, wherein the first free layer has a first stripe height and the second free layer has a second stripe height, and wherein the first stripe height and the second stripe height are substantially equal.

8. The magnetic read head assembly of claim 1, wherein the DFL structure comprises a first surface disposed adjacent to the first shield and perpendicular to the media facing surface, wherein the RHB bulk layer comprises a first surface disposed adjacent to the first shield and perpendicular to the media facing surface, and wherein the first surface of the DFL structure is substantially planar with the first surface of the RHB bulk layer.

9. A magnetic recording device comprising the magnetic read head assembly of claim 1.

10. A magnetic read head assembly, comprising:
   a first shield;
   a second shield disposed over the first shield;
   a rear hard bias (RHB) structure disposed between the first shield and the second shield recessed from a media facing surface, the RHB structure formed by milling into the first shield a first depth, wherein the RHB structure has a first stripe height, and wherein the RHB structure comprises:
      a RHB bulk layer;
      a RHB seed layer disposed between the RHB bulk layer and the first shield; and
      a RHB capping layer disposed between the RHB bulk layer and the second shield, the RHB capping layer being in contact with the RHB seed layer; and a tunnel magneto-resistive (TMR) sensor disposed adjacent to the RHB structure at the media facing surface, the TMR sensor being formed by milling into the first shield a second depth different than the first depth, wherein the RHB seed layer extends below the second depth of the TMR sensor, and wherein the TMR sensor comprises:
- a first free layer having a second stripe height from the media facing surface to the RHB structure, the second stripe height being less than the first stripe height; and
- a second free layer disposed over the first free layer, the second free layer having a third stripe height from the media facing surface to the RHB structure, wherein the second stripe height is substantially equal to the third stripe height.

11. The magnetic read head assembly of claim 10, wherein:
the RHB seed layer has a first thickness between about 26 Angstroms and about 46 Angstroms;
the RHB bulk layer has a second thickness between about 150 Angstroms and about 300 Angstroms; and
the RHB capping layer has a third thickness between about 30 Angstroms and about 100 Angstroms.

12. The magnetic read head assembly of claim 10, wherein the RHB structure further comprises an insulation layer disposed adjacent to the TMR sensor, the insulation layer extending perpendicular from the first shield to the second shield.

13. The magnetic read head assembly of claim 12, wherein the RHB capping layer and the insulation layer are disposed between the RHB bulk layer and the second shield.

14. The magnetic read head assembly of claim 10, wherein the difference between the first depth and the second depth is about 10 nm to about 15 nm.

15. The magnetic read head assembly of claim 10, wherein the second stripe height and the third stripe height are each between about 15 nm to about 50 nm, and wherein the first stripe height is between about 50 nm to about 1000 nm.

16. The magnetic read head assembly of claim 10, wherein an insulation layer forms a vertical junction extending perpendicularly between the first shield and the second shield, the vertical junction being disposed between the RHB structure and the TMR sensor, and wherein the RHB seed layer is disposed between the RHB bulk layer and the vertical junction.

17. The magnetic read head assembly of claim 16, wherein:
the RHB seed layer comprises at least one of tantalum and tungsten;
the RHB bulk layer comprises cobalt platinum;
the RHB capping layer comprises tantalum; and
the insulation layer comprises at least one of aluminum oxide, magnesium oxide, silicon nitride, and silicon oxide.

18. The magnetic read head assembly of claim 10, wherein the TMR sensor further comprises a barrier layer disposed between the first free layer and the second free layer, the barrier layer having a fourth stripe height from the media facing surface to the RHB structure, wherein the fourth stripe height is substantially equal to the third stripe height.

19. The magnetic read head assembly of claim 10, wherein the TMR sensor comprises a first surface disposed adjacent to the first shield and perpendicular to the media facing surface, wherein the RHB bulk layer comprises a first surface disposed adjacent to the first shield and perpendicular to the media facing surface, and wherein the first surface of the TMR sensor is substantially planar with the first surface of the RHB bulk layer.

20. A magnetic recording device comprising the magnetic read head assembly of claim 9.

* * * * *